United States Patent [19]

Cull et al.

[11] 4,001,376

[45] Jan. 4, 1977

[54] FLUE GAS DESULFURIZATION SORBENT AND PROCESS

[75] Inventors: Neville L. Cull, Baker; Warren M. Smith, Baton Rouge, both of La.

[73] Assignee: Exxon Research & Engineering Co., Linden, N.J.

[22] Filed: Mar. 6, 1975

[21] Appl. No.: 555,989

Related U.S. Application Data

[63] Continuation of Ser. No. 315,590, Dec. 15, 1972, abandoned.

[52] U.S. Cl. .................................. 423/244; 252/190
[51] Int. Cl.² ....................... C01B 17/00; B01J 8/00
[58] Field of Search ..................... 423/242–244; 252/190

[56] References Cited

UNITED STATES PATENTS 3,502,595    3/1970    Johnson et al. .................... 252/437
3,776,854    12/1973    Dautzenberg et al. ........ 423/244 X

FOREIGN PATENTS OR APPLICATIONS 1,448,396    6/1966    France ............................. 423/244
1,154,008    6/1969    United Kingdom ............... 423/244

*Primary Examiner*—Oscar R. Vertiz
*Assistant Examiner*—Gregory A. Heller
*Attorney, Agent, or Firm*—Wayne Hoover

[57] ABSTRACT

Sulfur dioxide is removed from gas mixtures such as flue gas containing the same by contacting the gas mixture with a solid sorbent comprising a porous gamma-alumina base, about 2 to 20 percent by weight (based on alumina) of a coating of a refractory oxide such as titanium dioxide, zirconium dioxide, or silica, and an active material, such as copper oxide, which is capable of selective removal of sulfur oxides from a gas mixture.

9 Claims, No Drawings

4,001,376

FLUE GAS DESULFURIZATION SORBENT AND PROCESS

This is a continuation of application Ser. No. 315,590, filed Dec. 15, 1972, and now abandoned.

BACKGROUND OF THE INVENTION

This invention relates to solid flue gas desulfurization sorbents and their preparation, and to methods of removing sulfur oxides from gas mixtures using the same.

Sulfur dioxide is an atmospheric pollutant which is present in small amounts in various waste gas mixtures, such as flue gas and certain smelter gases. Flue gases may also contain small amounts (usually only trace quantities) of sulfur trioxide. Sulfur dioxide and sulfur trioxide will be referred to collectively herein as "sulfur oxides". Processes for the selective removal of sulfur oxides from flue gas and other waste gas streams are known. Most of these processes are cyclic regenerative processes employing either a solid sorbent or an aqueous solution which selectively removes sulfur oxides.

Examples of cyclic regenerative processes using a dry solid sorbent or acceptor are described in British Pat. Nos. 1,089,716, 1,154,009, and 1,160,662, and in U.S. Pat. No. 3,501,897. British Pat. Nos. 1,089,716 and 1,160,662 describe the use of copper oxide on gamma-alumina as the sorbent; British Pat. No. 1,154,009 discloses the use of potassium oxide and vanadium pentoxide on porous alumina; and U.S. Pat. No. 3,501,897 discloses both types of sorbents. In the processes of all of these patents, flue gas containing $SO_2$ and oxygen is contacted with the solid sorbent or acceptor until breakthrough of $SO_2$ into the effluent gas occurs. The sorbent is then regenerated with a reducing gas. Removal of $SO_2$ is accomplished in these processes by reaction of $SO_2$ and oxygen with the active component of the sorbent; thus, copper oxide is partially converted to copper sulfate. The sulfation of the active materials in nearly all cases is incomplete at the time that breakthrough occurs. Breakthrough may be defined as occurring when a stated percentage of the $SO_2$ in the incoming gas, e.g., 10% over a whole cycle, passes into the effluent gas. Other contact masses, such as copper oxide on silica have also been tried out but found to be less satisfactory than copper oxide on alumina.

Although gamma-alumina is a good carrier material from the standpoint of sorbent activity in flue gas desulfurization sorbents, it has been found to be subject to attrition, even in fixed beds, after numerous flue gas desulfurization cycles, as reported for example in British Pat. No. 1,160,662. To improve the hardness and attrition resistance of the sorbent, British Pat. 1,160,662 suggests the use of about 1 to 20% by weight, calculated on the solid carrier material, of colloidal silica as a reinforcing material.

The preparation of coated or reinforced high surface area catalysts for other processes is well known. U.S. Pat. Nos. 3,502,595 and 3,615,166 are cited as two examples of such catalysts and their methods of preparation. U.S. Pat. No. 3,502,595 describes a process of preparing cracking catalyst having an acidic support such as silica-alumina or titania-alumina by reacting gamma alumina which is at least slightly hydrated with an alkyl ester, such as ethyl orthosilicate, in an organic solvent medium, and separating the solid alumina-inorganic oxide particles from the solvent and the alcohol produced in the reaction. U.S. Pat. No. 3,615,166 describes coated catalysts comprising a high surface area refractory core material (e.g., alumina) and a coating oxide (e.g., zirconia or thoria), which are prepared by dispersing colloidal size particles of the core material in an aqueous solution of a zirconium or thorium salt, adding an alkaline reagent to precipitate zirconia or thoria, drying and calcining. The products of both patents, U.S. Pat. Nos. 3,502,595 and 3,615,166 can be impregnated with other catalytically active metals (e.g., platinum) by known techniques. Reactions of metal alkoxides (which can also be considered as alkyl esters of inorganic acids) are also discussed in D.C. Bradley, "Metal Alkoxides", ACS Monograph No. 23, "Metal Organic Compounds", pp. 10–37 (1959).

SUMMARY OF THE INVENTION

Porous solid sorbents of improved strength and strength maintenance comprising a gamma alumina carrier coated with a refractory oxide and impregnated with an active metal or metal oxide are prepared according to this invention by forming on particles of a porous gamma alumina carrier a liquid surface coating containing a hydrolyzable organic compound which on hydrolysis and calcination yields the desired oxide coating material, hydrolyzing and calcining the organo metallic compound to the corresponding oxide, impregnating the coated carrier with a solution of a salt of a desired active metal, and drying and calcining the impregnated carrier in order to convert the active metal salt to the corresponding active metal oxide. The coating is a refractory oxide, preferably a refractory metal oxide such as titanium dioxide or zirconium dioxide. Silica is an alternative coating material. This coating is deposited in situ on the alumina carrier by hydrolysis of a decomposable compound such as tetrabutyl zirconate, tetraisopropyl titanate, or ethyl silicate Sulfur dioxide is removed from gases such as flue gas according to this invention by contacting the gas with a sorbent as above described.

DESCRIPTION OF THE PREFERRED EMBODIMENT

The alumina carrier or base in the contact materials of this invention is porous gamma alumina, having a surface area (BET) of at least about 80 square meters per gram and preferably at least about 100 square meters per gram. The alumina carrier is in the form of preformed particles of any desired shape, such as spheres, extrudates, rings or saddles. The carrier particles may be of any desired size. Various commercial catalyst and sorbent grade aluminas which fulfill these requirements are available.

The alumina base is coated according to this invention with about 2% to about 20% by weight, based on the weight of alumina, of a second refractory oxide. Preferably, this refractory oxide is a metal oxide. The choice of metal oxide is based on the properties of the metal oxide and the ease of preparation of the metal alkoxide from which the metal oxide coating is laid down. Thus, oxides of titanium and zirconium (Group IV-B metals) are preferred because of their properties and the availability of the corresponding alkoxides. The acidic refractory oxides, i.e., refractory oxides of nonmetals, are ordinarily less desirable because of lower flue gas desulfurization activity. Thus, silica can be used as a coating material, but the maximum loading should not be more than about 5% by weight based on alumina in order not to impair sulfur dioxide removal activity significantly. Boria has been found unacceptable as a coating material because flue gas desulfurization activity is greatly impaired. The Group IV-B metal oxides, and particularly titania, are especially preferred. Other preferred refractory metal oxides are those of Groups III-B (e.g., rare earths and actinide series metals) and V-B (e.g., vanadium). The Group numbers refer to the Periodic Table according to H. G. Deming, "Periodic Chart of the Elements" as reproduced, for example, in Lange's Handbook of Chemistry, Eighth Edition, pp. 56 and 57 (1952).

In forming the refractory oxide coating, the alumina particles are first coated under anhyrous conditions with a hydrolyzable organic compound which yields the desired refractory oxide coating material on hydrolysis and calcination. This may be done by immersing the particles in a liquid medium containing the compound, or by vapor deposition. The liquid medium can be either the hydrolyzable compound in bulk or a solution of the compound in a suitable solvent.

Preferred hydrolyzable compounds are esters of an alcohol or phenol and an inorganic acid corresponding to the desired oxide coating material. The alcohol or phenol corresponding to the ester is an alcohol or phenol containing up to about 8 carbon atoms. Suitable lower alkyl esters include tetraisobutyl zirconate, tetraisopropyl titanate, tetra-n-butyl titanate, tetra-sec.-butyl titanate, tetra-tert.-butyl titanate, tetrakis(2-ethyl hexyl) titanate, tetrabutyl zirconate, tetraethyl orthosilicate, etc. Cycloalkyl esters include tetracyclohexyl titanate. In general, alkyl esters in which the alkyl groups contain from 2 to 4 carbon atoms are preferred because of the greater ease of hydrolysis. The ease of hydrolysis decreases with increasing carbon number. When the desired oxide coating is a metal oxide, the corresponding hydrolyzable organic compound is an organometallic compound.

The esters may be represented by the general formula:

$$M(OR)_n$$

where M is an element forming a refractory oxide, R is a lower alkyl, cycloalkyl, aryl, or aralkyl radical containing from 1 to about 8 carbon atoms, and $n$ is the valence of M. M is preferably a transition metal of Group IIIB, IV-B or V-B and most preferably of Group IV-B, e.g., titanium or zirconium. R is preferably a lower alkyl radical containing from 2 to 4 carbon atoms. Alternatively, the alkyl esters herein can be named as metal alkoxides or as alkoxy derivatives of silane.

Suitable solvents for the hydrolyzable organic compound include hydrocarbons such as hexane and heptane, and alcohols such as isopropyl alcohol and butanol. In the case of alcohol solvents, the solvent alcohol is usually the same as the alcohol moiety of the ester.

The amount of oxide coating material deposited is controlled by variations in the concentration of the organic compound, the length of time of immersion, the temperature of immersion, or any combination of these. Variations in the solution concentration provide particularly good control over the coating weight attained. The temperature of immersion may vary from room temperature or lower up to the boiling point of the solution; but is preferably from about 50° C. up to the boiling point. Excellent results have been obtained using immersion temperatures of about 50° to about 60° C. Immersion times ordinarily run from a few minutes up to about 1 hour; good results have been obtained using immersion times of about ½ hour. The solution concentration may be varied anywhere from about 20% to 100% by weight of hydrolyzable organic compound, based on the total weight of solution; the value of 100%, of course, represents the use of a decomposable organic compound in bulk. The carrier particles may be separated from the liquid medium by suitable means, such as decantation, when the desired immersion time has ben reached.

The alternative method of applying the liquid coating containing the hydrolyzable organic compound is by vapor deposition. The organic compound is vaporized and is allowed to condense on the alumina particle surfaces.

Next, the wet carrier material containing the liquid coating of hydrolyzable organic compound is treated with water vapor in order to hydrolyze the hydrolyzable organic compound. This may be accomplished by exposing the carrier particles to a moist gaseous atmosphere such as air of normal moisture content for a suitable length of time. For example, exposure of the soaked carrier particles to moisture-containing air which preferably has a relative humidity of about 50 to about 100% for periods of about 16 hours (i.e., overnight) and at room temperature have resulted in the desired hydrolysis. Neither relative humidity, temperature nor time are critical. However, use of air having a relative humidty below about 50% requires longer hydrolysis times. Moist nitrogen can also be used. Accelerated hydrolysis can be obtained if desired using steam or using air of high relative humidity at elevated temperatures, however, these expedients are not necessary. After hydrolysis, the composite carrier of alumina with the coating thereon may be dried and then calcined to give the desired oxide coating. It is believed that a high molecular weight inorganic polymer coating is formed during air hydrolysis and calcination.

The above coating procedure can be repeated where a single application of hydrolyzable organic compound followed by hydrolysis and calcination does not give a coating of sufficient thickness.

The amount of coating material deposited on the alumina surfaces can be approximated by the weight gain in the carrier particles by treatment with the hydrolyzable organic metal compound, followed by hydrolysis, drying and calcination as above described. Coating weights in this application were obtained by this method unless otherwise indicated. In some cases, the amount of coating material has been determined both by this weight gain method and by conventional quantitative analysis techniques; the latter usually indicate a greater percentage of coating material weight. Thus, the coating material weight as reported herein may be somewhat lower than actual values.

After the oxide coating has been applied to the alumina base, the resulting coated carrier material can be impregnated with a decomposable compound of a desired active metal according to conventional techniques. Thus, when a sorbent having copper oxide as its active material is desired, the coated alumina may be impregnated with a suitable copper salt, such as copper nitrate, in aqueous solution, and the impregnated sorbent may then be dried and calcined in order to convert the copper nitrate to copper oxide. Other active metal oxides may be similarly applied by appropriate choice of metal salts. Where the active material is desired in the form of a free metal rather than the metal oxide, the metal oxide may be reduced to the free metal with a suitable reducing agent such as hydrogen according to means known in the art. The choice of active material of course depends on the use to which the contact mass is to be put. Copper oxide is the preferred active material in the case of flue gas desulfurization sorbents, although flue gas desulfurization sorbents containing a mixture of potassium oxide and vanadium pentoxide as the active material are known as earlier indicated.

Catalysts and sorbents for other reactions can also be prepared according to this invention, using active materials which are known in the art. Thus, for example, platinum catalysts for oxidation and hydrogenation reactions can be prepared by applying platinum to a coated carrier which has been prepared as described above. A catalyst of either iron oxide or copper oxide on titania-coated alumina can be used for the selective removal of nitrogen oxides from gases such as flue gas. Other active materials, depending on the intended use of the finished catalyst or sorbent, include the oxides of chromium, manganese, cobalt and nickel, as well as other active catalytic and sorbent materials which are known in the art.

The contact masses, i.e., catalysts and sorbents, produced according to this invention are particularly useful in processes, such as the removal of sulfur dioxide from flue gases or other gases containing the same, where attrition of conventional catalysts or sorbents comprising an active material on alumina is a problem. The catalysts and sorbents prepared according to this invention exhibit improved strength and strength maintenance as compared to catalysts and sorbents having the same active material on alumina but with the coating oxide omitted. Improved strength, i.e., crushing strength, and strength maintenance, i.e., strength of a particle of catalyst or sorbent after the catalyst or sorbent has been in service for a measured length of time, can be correlated with improved attrition resistance in service. Sorbent activity of the contact materials prepared according to this invention is in most cases comparable to the activity of the corresponding material in which the coating oxide is omitted. In some cases, the activity of materials produced according to the present invention are slightly lower than the activities of the corresponding materials in which the oxide coating is omitted; however, in most cases no significant loss of activity is encountered. Activity in the case of flue gas desulfurization sorbents is indicated by the percentage of active material which is sulfated in a normal operating cycle at the time that maximum desirable sulfur dioxide break-through into the effluent occurs.

Flue gas desulfurization using the sorbents of the present invention can be carried out under desulfurizing conditions known in the art. Thus, for example, a conventional sulfation-regeneration cycle may be used. During the sulfation period, flue gas or other gas stream containing sulfur dioxide and oxygen is contacted with the contact mass at a suitable inlet temperature, e.g., approximately 600°–900° F. in the case of copper oxide sorbents, and slightly higher, e.g., about 700°–1000° F. in the case of $K_2O$—$V_2O_5$ sorbents. When maximum desirable breakthrough of sulfur dioxide into the effluent occurs, e.g., when the amount of sulfur dioxide in the effluent, as measured over a whole operating cycle, reaches 10% of the amount of $SO_2$ in the incoming gas, the sulfation (or sorption) period is stopped and the sorbent is regenerated. The preferred regeneration gas is a reducing gas, such as hydrogen, carbon monoxide, mixtures of these, or a hydrocarbon such as methane, ethane, propane, butane or heavier hydrocarbons such as octane, decane, etc. The reducing gas or gas mixture may be mixed with steam if desired. Hydrogen-steam mixtures are especially preferred. The regeneration gas inlet temperature is preferably about the same as the flue gas inlet temperature. This minimizes sorbent attrition. The sorbent is preferably in a fixed bed, and both the gas to be treated for removal of $SO_2$ and the regeneration gas are passed through the fixed bed at a suitable space velocity. In the case of the $SO_2$-containing gas, suitable space velocities are generally in the range of about 1000 to about 10,000 v/v/hr. The sorbent bed may be purged with a suitable inert gas such as steam or nitrogen after either the sorption period, the regeneration period, or both, as desired.

While the removal of sulfur oxides has been particularly described with respect to removal of sulfur dioxide, it will be evident that any sulfur trioxide which is contained in the incoming gas mixture will be removed under conditions which achieve removal of sulfur dioxide.

The invention will now be described in further detail with reference to the examples which follow.

EXAMPLE 1

This example describes the coating of calcined alumina particles with oxides of titanium, zirconium and silicon, and strength tests on the coated particles. A few samples in this example were also impregnated with copper oxide.

The alumina base in this example consisted of ½-inch alumina saddles, having the shape shown in U.S. Pat. No. 2,639,909, which had been previously calcined at 1000° F. for 3 hours, and which had a surface area (BET) of 303 square meters per gram and a pore volume (BET) of 0.59 cubic centimeters per gram. This material will be designated A-1.

A portion of the above saddles was impregnated by immersion in an aqueous solution of copper nitrate [27% by weight of $Cu(NO_3)_2.3H_2O$] for 10 minutes. The saddles were removed from the impregnated solution, blotted to remove excess liquid, air dried for 20 hours, and then calcined for 3 hours at 800° F. This material is designated A-2.

Three batches of the above-described alumina saddles, each batch weighing about 25 grams, were coated with varying quantities of titanium dioxide according to the following procedure: A batch of alumina saddles was weighed and charged to a reactor. Liquid tetraisopropyl titanate, either in bulk or in a 50% (by weight) solution in hexane, was added to the reactor in sufficient quantity to cover completely the alumina saddles. The concentrations of the solution were varied in order to give different coating weights of $TiO_2$. The reactor and its contents were heated to about 50° to 60° C. and held at this temperature for about 30 minutes. The reactor and its contents were then cooled to room temperature, and the solution was decanted off. The saddles were allowed to hydrolyze in air for 16 hours at room temperature, were then dried in a forced air oven at 117° C. for 6 hours, and were then calcined overnight at 590° C. (1100° F.). This treatment converted the tetraisopropyl titanate condensation product to titanium dioxide. The saddles were again weighed, and the weight gain of the treated saddles, based on the weight of the untreated alumina, was computed. These sorbents are designated A-3, A-4 and A-5. A portion of sorbent A-5 was impregnated with a 27% (by weight) aqueous solution of copper nitrate by immersion for 10 minutes. The saddles were removed, blotted dry, air dried for 20 hours, and then calcined for 3 hours at 800° F. These saddles are designated A-6.

Two batches of saddles were coated with zirconium oxide according to the above procedure except that a 50% (wt.) solution of tetraisobutyl zirconate in butanol was used in place of tetraisobutyl titanate solution. These batches are designated A-7 and A-8. A portion of the saddles in batch A-8, after coating with zirconium oxide, were immersed in a 27% (wt.) aqueous copper nitrate solution for 10 minutes, blotted dry, air dried for 20 hours and calcined for 3 hours at 800° F. The copper-impregnated saddles are designated A-9.

Two batches, designated A-10 and A-11, were coated with silica in the same manner as above. In coating A-10, 100% tetraethyl silicate was used whereas in A-11 a 50% (wt.) solution of tetraethyl silicate in hexane was used.

A portion of the saddles A-11 were impregnated with copper by immersion in a 27% (by weight) aqueous solution of copper nitrate for 10 minutes. The saddles were then removed, blotted to remove excess solution, air dried for 20 hours, and calcined for 3 hours at 800° F. The copper impregnated sorbent was designated A-12.

Oxide coating weights, coating solution concentrations, and amounts of copper where present are shown in Table I below. In Table I, oxide coating weights are based on the weight of uncoated and unimpregnated alumina. The amount of copper present is quoted as Cu, based on finished sorbent, although the copper is actually in the form of copper oxide.

TABLE I

| Sample | Coating | Coating Material | Coating Material Conc. | Wt. % Cu |
|---|---|---|---|---|
| A-1 | None | — | — | — |
| A-2 | None | — | — | 5.2 |
| A-3 | 14% TiO$_2$ | Ti(OPr)$_4$ | 100% | — |
| A-4 | 15% TiO$_2$ | Ti(OPr)$_4$ | 100% | — |
| A-5 | 9% TiO$_2$ | Ti(OPr)$_4$ | 50%(hexane) | — |
| A-6 | 9% TiO$_2$ | Ti(OPr)$_4$ | 50%(hexane) | 4.6 |
| A-7 | 9% ZrO$_2$ | Zr(OBu)$_4$ | 50% (butanol) | — |
| A-8 | 8.8% ZrO$_2$ | Zr(OBu)$_4$ | 50% (butanol) | — |
| A-9 | 8.8% ZrO$_2$ | Zr(OBu)$_4$ | 50% (butanol) | 4.6 |
| A-10 | 11% SiO$_2$ | Si(OEt)$_4$ | 100% | — |
| A-11 | 9.2% SiO$_2$ | Si(OEt)$_4$ | 50% (hexane) | — |
| A-12 | 9.2% SiO$_2$ | Si(OEt)$_4$ | 50% (hexane) | 5.0 |

In Table I above, Et = ethyl, Pr = isopropyl, and Bu = butyl.

EXAMPLE 2

This example describes the crushing strength and strength maintenance testing of samples of saddles taken from batches A-1, A-3 and A-7, prepared as described in Example 1. All samples, except for the "as received" sample from batch A-1, were calcined for 16 hours at 1100° F. The as received sample from batch A-1 was not calcined. In addition, one sample from each batch was acid treated by immersion overnight in 15% HCl. Each sample included 25 saddles.

The crushing strength of each saddle was determined as follows:

The crushing strength of a saddle is determined by measuring the force, in pounds, required to crush a single saddle between two polished flat steel plates. The strength tester consisted of a stationary bottom plate of circular cross section and a movable top plate of the same diameter as the bottom plate. Both plates had polished flat steel surfaces. The top plate was connected to a pressure gauge having an indicator which retained its reading from the moment of crush until reset to zero. Readings were in psig, which were converted to force in pounds from a chart which is previously obtained by calibration of the tester. Saddle strength is expressed as an average of the strengths of all the saddles tested plus a high and a low value. The saddle is placed in a standing upright (inverted U) position for testing. The moisture content of these saddles was standardized by allowing the saddles to remain overnight in the ambient air atmosphere followed by calcination for 3 hours at 650° F. Calcined saddles were transferred to bottles, the bottle tops sealed, and the saddles cooled down to room temperature for testing. The average, high and low crushing strengths, in pounds, of the saddles from each sample are recorded in Table II below. The strength retention of acid treated samples in percent, measured by dividing the average strength of acid treated saddles by the average strength of saddles from the same batch which were not acid treated, is also given in Table II.

TABLE II

| Batch | Coating | *Treatment | Strength, lbs. Avg. | High | Low | % Strength Retained |
|---|---|---|---|---|---|---|
| A-1 | None | As received | 7 | 14 | 4 | |
| | | C | 10 | 13 | 6 | |
| | | C + AT | 5 | 9 | 1 | 50 |
| A-3 | 14% TiO$_2$ | C | 19 | 29 | 9 | |
| | | C + AT | 10 | 17 | 7 | 53 |
| A-7 | 9% ZrO$_2$ | C | 18 | 26 | 10 | |
| | | C + AT | 19 | 29 | 9 | 55 |

*C = calcined
C + AT = calcined and acid treated

Calcined saddles, which were coated with either titania or zirconia, had appreciably higher strengths than the calcined uncoated alumina saddles, as Table II shows. Acid treatment caused appreciable weakening of the titania- and zirconia-coated alumina saddles, as well as of the uncoated alumina saddles. Percentage strength losses as the result of acid treating were not appreciably different. However, the acid treated titania- and zirconia-coated saddles were appreciably stronger than the uncoated alumina saddles which were not acid treated.

EXAMPLE 3

This example describes strength and strength maintenance of five batches of coated saddles and one control batch of uncoated alumina saddles, prepared as described in Example 1, under flue gas desulfurization conditions.

Simulated cyclic flue gas desulfurization runs were carried out as follows: A batch of saddles to be tested was charged to a tubular reactor having an inside diameter of 3 inches and a length of 26 inches. Simulated flue gas, containing 2700 ppm of sulfur dioxide, 2.5% by volume of oxygen, balance nitrogen, was passed through the reactor at an inlet temperature of 650° F. and a space velocity of 2000 v/v/hr. for 20 minutes. Then a regeneration gas consisting of 40% by volume of hydrogen and 60% by volume of steam was passed through the reactor at an inlet temperature of 650° F.

and a space velocity of 600 v/v/hr. for a period of 3 minutes. Repeated cycles were carried out in this manner for a period of three weeks. The effluent sulfur dioxide contents in the simulated flue gases were not measured, and it is assumed that little or no sulfur dioxide was removed, since no copper was present in the saddles used in this test. The crushing strength of 25 saddles from each batch were measured before and after the test in the manner described in Example 2. In all batches except one, the saddles were noted to be stronger at the end of the test than at the beginning. The strength of the saddles after each test was compared with the strength of the uncoated alumina saddles (batch A-1) before the test, and the result is reported as percentage gain. Results are given in Table III below.

TABLE III

| Batch | Coating | Avg. Particle Strength, lb. Before | After | % Gain relative to uncoated base |
|---|---|---|---|---|
| A-1 | None | 13 | 14 | +8 |
| A-4 | 15% TiO₂ | 15 | 18 | +38 |
| A-5 | 9% TiO₂ | 17 | 16 | +23 |
| A-8 | 8.8% ZrO₂ | 17 | 19 | +46 |
| A-10 | 11% SiO₂ | 13 | 17 | +31 |
| A-11 | 9.2% SiO₂ | 18 | 20 | +54 |

It will be noted from Table III above that the initial strengths of all coated samples were greater than the initial strength of the uncoated alumina saddles in batch A-1. Also, all batches of saddles except batch A-5 were found to be stronger after the tests than before. Differences of ± 1 pound are probably not significant; the reproducibility of test results is probably about ±10%.

EXAMPLE 4

This example gives strength and strength maintenance data of four supported copper oxide sorbents prepared as described in Example 1, including batches (A-6, A-9 and A-12) of copper oxide on coated alumina and one batch (A-2) of copper oxide on uncoated alumina, under flue gas desulfurization conditions.

A series of flue gas desulfurization runs (one for each batch) was carried out using the same reactor and the same desulfurization and regeneration conditions as those described in Example 3. The flue gas and regeneration gas compositions were also the same as in Example 3.

A total of 1151 cycles was carried out in this manner in each run. The particle strengths (average, high and low) before and after each run were determined by taking 25 saddles from each batch before the run and 25 saddles from each batch after the run, and carrying out the strength test described in Example 2. From these data, strength retention was computed as the average particle stength from a given batch after the test, divided by the average particle strength before the same test, multiplied by 100. Results are given in Table IV below.

TABLE IV

| Batch | Coating | Wt.% Cu | Strength Before, lb. Avg. | H | L | Strength After, lb. Avg. | H | L | % Str. Ret. |
|---|---|---|---|---|---|---|---|---|---|
| A-2 | None | 5.2 | 15 | 24 | 6 | 10 | 20 | 5 | 67 |
| A-6 | 9% TiO₂ | 4.6 | 16 | 31 | 7 | 16 | 32 | 7 | 100 |
| A-9 | 8.8% ZrO₂ | 4.6 | 17 | 26 | 5 | 15 | 40 | 4 | 88 |
| A-12 | 9% SiO₂ | 5 | 21 | 33 | 11 | 18 | 35 | 7 | 86 |

It will be noted that the saddles having coated alumina carriers (batches A-6, A-9 and A-12) were only slightly stronger at the start of the test than the saddles (batch A-2) having an uncoated alumina carrier, but exhibited considerably better strength retention. The saddles of copper oxide on titania-coated alumina exhibited the best retention of all, followed by the saddles of copper oxide on zirconia-coated alumina. Sulfur dioxide removal from the simulated flue gas was not measured in this test. However, sulfur dioxide was removed from flue gas and the sorbent was regenerated, in each cycle.

It will be noted that the strength retention results in this example were not quite as good as those in Example 3. Thus, while the sorbents in Example 3, which contained no copper, actually gained strength during the simulated flue gas desulfurization test, the sorbents in this example, with the exception of sorbent A-6, show some strength loss. This can probably be accounted for by greater cyclic variations in temperature in this example, due to the exothermic nature of both the desulfurization and the regeneration reactions.

EXAMPLE 5

This example describes the preparation and testing, under flue gas desulfurization conditions, of a sorbent of copper oxide on silica-coated alumina, and a control sorbent of copper oxide on alumina.

The alumina carrier in this example consisted of ⅛-inch cylindrical extrudates, manufactured by the Harshaw Chemical Company of Cleveland, Ohio, having a surface area of 214 m²/g. and a pore volume of 0.74 cc/g. These extrudates were calcined for 16 hours at 1000° F. prior to further treatment according to this example.

Sixty grams of the alumina extrudates described above were impregnated with 18.3 grams of copper nitrate trihydrate dissolved in 41.0 grams of water (30.9% by weight copper nitrate trihydrate concentration). The extrudates were air dried overnight and calcined for 3 hours at 800° F. The resulting sorbent contained 8% Cu by weight based on the alumina. This sorbent is designated B-1.

Thirty grams of the above sorbent, B-1, were immersed in a solution of tetraethyl silicate (25% by weight) in hexane for 30 minutes at 50°–60° C. The excess solution was decanted off and the extrudes were allowed to hydrolyze in air for 48 hours. The extrudates were then calcined for 3 hours at 900° F. This sorbent contained about 3% by weight of silica, as determined by weight gain, and is designated B-2.

Each of the batches of extrudates was evaluated for strength both before and after a cyclic flue gas desulfurization run, which was carried out in the manner described in Example 3, using simulated flue gas and regeneration gas having the same respective compositions as those described in Example 3. Results are shown in Table V below:

TABLE V

| Batch | Coating | Wt. % Cu | Average Particle Strength Before | Average Particle Strength After | % Gain Based on Control |
|---|---|---|---|---|---|
| B-1 | None | 8 | 18 | 20 | +11 |
| B-2 | 3% SiO₂ | 8 | 21 | 26 | +44 |

The strength gain in Table V above is based on the average particle strength of the control particles (batch B-1) before the flue gas desulfurization run. Both the control sorbent and the test sorbent were stronger after the flue gas desulfurization test than before.

EXAMPLE 6

This example shows the preparation and activity testing of copper oxide on silica-coated alumina sorbents. A control sorbent of copper oxide on uncoated alumina was also prepared and tested.

The alumina base used in this example was a commercially available alumina (made by Harshaw Chemical Company, Cleveland, Ohio) in the form of ⅛-inch extrudates, which had been previously calcined for 16 hours at 800° F., having a surface area of 232 m²/g. and a pore volume of 0.79 cc g.

One batch of the above alumina extrudates was impregnated with aqueous 25.4% by weight copper nitrate [Cu(NO₃)₂.3H₂O] solution, dried and calcined. This gave a sorbent containing 6% by weight of copper, based on the weight of alumina. This sorbent was designated C-1.

A second batch of alumina extrudates was immersed in a quantity of 17.4% (by volume) solution of tetraethyl silicate in hexane sufficient to fill the pore volume of the alumina, and was allowed to stand overnight in a stoppered flask. The extrudates were then hydrolyzed in air for 24 hours and calcined for 16 hours at 1100° F. The resulting silica-coated alumina extrudates were impregnated with 25.4% copper nitrate solution, dried and calcined for 3 hours at 800° F. The percentage silica (by weight gain) was 2.6%, based on untreated alumina; and the percentage of copper by analyses was 6.1%, based on total sorbent. The sorbent was designated C-2.

A second batch of copper oxide on silica-coated alumina extrudates, designated as C-3, was prepared by immersing the alumina extrudates in an excess of 17.4% (by volume) of tetraethyl silicate solution in hexane, allowing it to stand for one hour, decanting off the excess, then allowing the extrudates to stand overnight in a stoppered flask, followed by air hydrolysis, calcination, copper impregnation, drying, and calcination as in the case of batch C-2. This batch of saddles contained 4.1% by weight of silica (by weight gain based on untreated alumina) and 6.4% by weight of copper, after impregnation based on total sorbent.

A fourth batch of alumina extrudates was first coated with silica by treating the alumina with vapor phase tetraethyl silicate. This was accomplished by placing the extrudates (about 50 grams) in a plastic beaker, the bottom of which contained a plurality of drilled holes so that vapor could pass through but the extrudates could not. This plastic container was placed on top of a beaker containing 3 grams of tetraethyl orthosilicate (100%). These two beakers were placed in a pint jar which was capped and heated in an oven at 190° F. for 24 hours. The beakers and their contents were cooled down, and the extrudates were then removed. These extrudates were coated with liquid tetraethyl orthosilicate. The extrudates were then allowed to hydrolyze in air for 24 hours, and then were calcined in air for 16 hours at 1100° F. The percentage of silica by weight gain was 2.3% by weight based on alumina. The coated alumina was then impregnated with an aqueous copper nitrate solution [25.4% of Cu(NO₃).3H₂O by weight], air dried and calcined for 3 hours at 800° F. This sorbent was designated C-4.

All of the sorbents in this test had nominal copper contents of 6% Cu by weight. The copper contents of batches C-1, C-2 and C-3 as determined by analysis have been indicated; batch C-4 was not analyzed for copper content.

The sulfur dioxide removal activity of each of the above sorbents was evaluated in a flue gas desulfurization run consisting of three sorption-regeneration cycles. During the sorption period of each cycle, synthetic flue gas containing 2700 ppm by volume of SO₂, 2.5% by volume of oxygen, balance nitrogen, was passed through a fixed bed of the sorbent contained in a tubular reactor 12 inches long and 1 inch in diameter at an inlet temperature of 650° F. and a space velocity of 5000 v/v/hr. The sorption period was stopped when the amount of SO₂ in the effluent flue gas reached 10% of the amount of SO₂ in the incoming flue gas (i.e., 90% SO₂ removal). The length of time of the sorption period was recorded as the breakthrough time. The sorbent was then regenerated with a mixture of 20% by volume of hydrogen and 80% by volume of steam at an inlet temperature of 650° F. Then a new cycle was begun. Results are shown in Table VI below.

TABLE VI

| Batch | Wt. % SiO₂ | Coating Method | Wt. % Cu Nom. | Wt. % Cu Anal | Sorption Time, Min. | Sorption % Cu Utilization |
|---|---|---|---|---|---|---|
| C-1 | None | — | 6 | 6.4 | 11 | 20 (19) |
| C-2 | 2.6 | solution | 6 | 6.1 | 11 | 19.5 (19) |
| C-3 | 4.1 | solution | 6 | 6.2 | 10 | 18 (17) |
| C-4 | 2.3 | vapor phase | 6 | — | 11 | 19 |

Copper utilization values in parentheses in Table VI above represent utilization based on analyzed values for copper.

As Table VI shows, breakthrough times using copper impregnated silica-coated sorbents of this invention are about the same as, or only slightly shorter than the breakthrough times using the control sorbent (C-1) of copper oxide on uncoated alumina. Copper utilization percentages (which are the percentages of copper oxide converted to copper sulfate during the sorption period) are only slightly worse in the case of silica-coated alumina sorbents C-2, C-3 and C-4 than in the case of the uncoated alumina sorbent C-1. Thus, the improvement in strength and strength maintenance in copper oxide on silica-coated alumina sorbents, as compared to the copper oxide on uncoated alumina sorbents, noted in earlier examples, is gained with only minimal reduction in activity.

EXAMPLE 7

This example describes the preparation and activity testing of copper oxide on titania-coated alumina and copper oxide on zirconia-coated alumina extrudates. A control sorbent of copper oxide on uncoated alumina extrudates was also prepared and tested.

The alumina base used in this example was a commercially available alumina in the form of ⅛-inch extrudates, made by Harshaw Chemical Company of Cleveland, Ohio. These extrudates were calcined for 16 hours at 800° F.; the calcined extrudates had a surface area of 223 m²/g. and a pore volume of 0.79 cc/g.

Control sorbent D-1 was prepared by impregnating 30 grams of the above-described alumina base with 6.8 grams of copper nitrate, $Cu(NO_3)_2 \cdot 3H_2O$, dissolved in 20 ml of water. The impregnated sorbent was air dried for 48 hours, calcined for 3 hours at 800° F. The nominal copper content was 6%; the copper content by analysis was 6.4%.

Sorbent D-2, which was copper oxide on titania-coated alumina, was prepared as follows: 52 grams of the above-described alumina extrudates were flooded with a 40 volume % solution of tetraisopropyl titanate in heptane. The solution was heated to about 50°–60° C. for 30 minutes, allowed to cool down, and the excess solution was decanted off. The extrudates were allowed to hydrolyze slowly in air at ambient temperature overnight. The extrudates were then calcined overnight by heating slowly to 1100° F. and then maintaining this temperature. The percentage of $TiO_2$ by weight gain was 11.7%; the percentage of $TiO_2$ by analysis was 9.3%. Thirty grams of the coated sorbent were impregnated with 6.85 grams of copper nitrate, $[Cu(NO_3)_2 \cdot 3H_2O]$ dissolved in 20 cc of water. The impregnated sorbent was air dried for 72 hours and then calcined for 3 hours at 800° F.

Sorbent D-3, consisting of copper oxide on zirconia coated alumina, was prepared as follows: 45 grams of the above-described alumina extrudates were immersed in a 50% by volume solution of tetrabutyl zirconate in butanol, heated to 50°–60° C. for 30 minutes, and the excess solution decanted. The extrudates were then hydrolyzed in air at ambient temperature overnight, then calcined overnight by slowly heating the extrudates to 1100° F. and maintaining this temperature. The amount of $ZrO_2$ by weight gain was 10.3% based on the weight of untreated alumina. Thirty grams of the coated sorbent were impregnated with 6.85 grams of copper nitrate dissolved in 20 cc of water. The impregnated sorbent was air dried for 72 hours and calcined for 3 hours at 800° F.

The reactor, desulfurization and regeneration conditions, and flue gas and regeneration gas compositions, were the same as in Example 6.

The above sorbents, D-1, D-2 and D-3 were tested for flue gas desulfurization activity in a 1-inch diameter tubular glass reactor using synthetic flue gas containing 2700 ppm by volume of $SO_2$ and 2.5% by volume of oxygen, balance nitrogen. Each of the sorbents was evaluated in a cyclic flue gas desulfurization run which consisted of three sorption-regeneration cycles. During the sorption step of each cycle, the synthetic flue gas was passed through the reactor at an inlet temperature of 650° F. at a space velocity of 5000 v/v/hr.; the sorption period was stopped when the amount of $SO_2$ in the effluent gas reached 10% of the amount of $SO_2$ in the incoming gas, as measured over the whole sorption period. The sorbent was then regenerated with a gas mixture of 20% by volume of hydrogen and 80% by volume of steam at an inlet temperature of 650° F. A new cycle was then carried out.

Table VII below gives the coating oxide and amount thereof, the amount of copper as determined by analysis (in each sorbent, the nominal amount of copper was 6% by weight, based on the weight of carrier base), the average length of sorption period, and the percentage of copper utilization (i.e., the average percentage of copper in the form of copper sulfate at the end of the sorption period) based on both nominal and actual copper content (the latter being shown in parentheses).

The titania and zirconia contents in batches D-2 and D-3 as shown in Table VII are both determined by weight gain.

TABLE VII

| Batch | Coating | Wt. % Cu Nom. | Wt. % Cu Anal. | Sorption Time, Min. | Sorption Cu Utilization % |
|---|---|---|---|---|---|
| D-1 | None | 6 | 6.4 | 12 | 20 (19) |
| D-2 | 11.7% $TiO_2$ | 6 | 4.9 | 13 | 21 (26) |
| D-3 | 10.3% $ZrO_2$ | 6 | — | 13 | 20 |

Copper utilization values in parentheses represent utilization based on analyzed values for Cu.

From the data in Table VII, it can be seen that equivalent or slightly superior activity for $SO_2$ removal was obtained by using titania-coated alumina or zirconia-coated alumina in place of uncoated alumina as the carrier. In view of improved strength maintenance data as shown in earlier examples using titania-coated alumina and zirconia-coated alumina carriers, sorbents of this invention comprising copper oxide on either a titania-coated alumina or a zirconia-coated alumina carrier are superior to copper oxide on conventional alumina carriers. Copper oxide on titania-coated alumina is especially desirable.

What is claimed is:

1. In a process wherein sulfur dioxide is separated from a gaseous mixture containing the same by contacting said gaseous mixture, under desulfurization conditions, with a solid sorbent comprising a carrier and an active material supported thereon, which active material will selectively react with sulfur dioxide at said desulfurization conditions, the improvement wherein the carrier comprises alumina and from about 2 to about 20 wt. %., based on the weight of alumina, of a refractory metal oxide different from alumina, said refractory metal oxide being disposed at or near the surface of the alumina by first contacting said alumina with a hydrolyzable organic compound under anhydrous conditions and then converting said hydrolyzable compound to said refractory metal oxide different from alumina.

2. The improvement of claim 1 wherein said refractory metal oxide different from alumina is a non-acidic refractory metal oxide.

3. The improvement of claim 1 wherein said refractory metal oxide different from alumina is an acidic refractory metal oxide and wherein the same is present on the surface of said alumina in an amount not greater than about 5 wt. %, based on the weight of said alumina.

4. The improvement of claim 1 wherein said alumina has a surface area (BET) of at least 80 square meters per gram.

5. The improvement of claim 4 wherein alumina is a γ-alumina.

6. The improvement of claim 2 wherein said non-acidic refractory metal oxide is titania.

7. The improvement of claim 2 wherein said non-acidic refractory metal oxide is zirconia.

8. The improvement of claim 1 wherein said active material is copper oxide.

9. A process according to claim 1 in which said gas mixture is contacted with said sorbent at a gas inlet temperature in the range of about 600° to about 1000° F.

* * * * *